United States Patent
Borg et al.

(10) Patent No.: US 10,293,998 B2
(45) Date of Patent: May 21, 2019

(54) VARIABLE CONE CONTAINER CARRIER

(71) Applicant: Oregon Precision Industries, Inc., Eugene, OR (US)

(72) Inventors: Zakary James Borg, Eugene, OR (US); Ronald Lee Mellor, Jr., Eugene, OR (US)

(73) Assignee: Oregon Precision Industries, Inc., Eugene, OR (US)

( * ) Notice: Subject to any disclaimer, the term of this patent is extended or adjusted under 35 U.S.C. 154(b) by 0 days.

(21) Appl. No.: 15/615,697

(22) Filed: Jun. 6, 2017

(65) Prior Publication Data

US 2018/0346216 A1 Dec. 6, 2018

(51) Int. Cl.
| | |
|---|---|
| *B65D 71/50* | (2006.01) |
| *B65D 71/20* | (2006.01) |
| *B65D 1/02* | (2006.01) |
| *F16L 23/04* | (2006.01) |

(52) U.S. Cl.
CPC .......... *B65D 71/504* (2013.01); *B65D 71/20* (2013.01); *B65D 71/50* (2013.01); *B65D 1/02* (2013.01); *B65D 2501/009* (2013.01); *F16L 23/04* (2013.01)

(58) Field of Classification Search
CPC .......... B65D 1/02; B65D 71/00; B65D 71/02; B65D 71/20; B65D 71/50; B65D 71/504; B65D 75/00; F16L 23/04
USPC .............. 206/150–153, 159; 294/87.2, 159
See application file for complete search history.

(56) References Cited

U.S. PATENT DOCUMENTS

| | | | | |
|---|---|---|---|---|
| 3,156,358 A | * | 11/1964 | Randrup | B65D 71/48 206/153 |
| 3,627,121 A | * | 12/1971 | Deasy | B65D 71/50 206/151 |
| 5,306,060 A | * | 4/1994 | Borg | B65D 71/50 206/151 |
| 5,480,204 A | * | 1/1996 | Erickson | B65D 71/50 206/151 |
| 5,735,562 A | * | 4/1998 | Borg | B65D 71/50 206/151 |
| 6,129,397 A | * | 10/2000 | Borg | B65D 71/50 206/151 |

(Continued)

FOREIGN PATENT DOCUMENTS

| | | |
|---|---|---|
| DE | 1150782 B | 6/1963 |
| KR | 20100046937 A | 5/2010 |

OTHER PUBLICATIONS

European Patent Office, Extended European Search Report Issued in Application No. 18174094.5, dated Oct. 26, 2018, Germany, 9 pages.

*Primary Examiner* — Bryon P Gehman
(74) *Attorney, Agent, or Firm* — Alleman Hall Creasman & Tuttle LLP

(57) ABSTRACT

A container carrier and manufacturing method therefore are provided. The container carrier may include an integrally molded body with a top surface, a bottom surface, and one or more oval structures. Each oval structure has a circumferential rib with a plurality of flanges coupled to the circumferential rib, and each flange includes an inwardly projecting portion. An inner perimeter of each flange is formed to have an arcuate shape, and the inner perimeters of the flanges are collectively configured to define a void.

18 Claims, 7 Drawing Sheets

(56) References Cited

U.S. PATENT DOCUMENTS

| | | | |
|---|---|---|---|
| 6,789,828 B1 * | 9/2004 | Borg | B65D 71/50 206/151 |
| 7,108,128 B2 * | 9/2006 | Borg | B65D 71/50 206/150 |
| 7,377,382 B2 * | 5/2008 | Borg | B65D 71/50 206/150 |
| 7,823,943 B2 * | 11/2010 | Borg | B65D 71/50 294/87.2 |
| 2007/0296231 A1 | 12/2007 | Borg | |

* cited by examiner

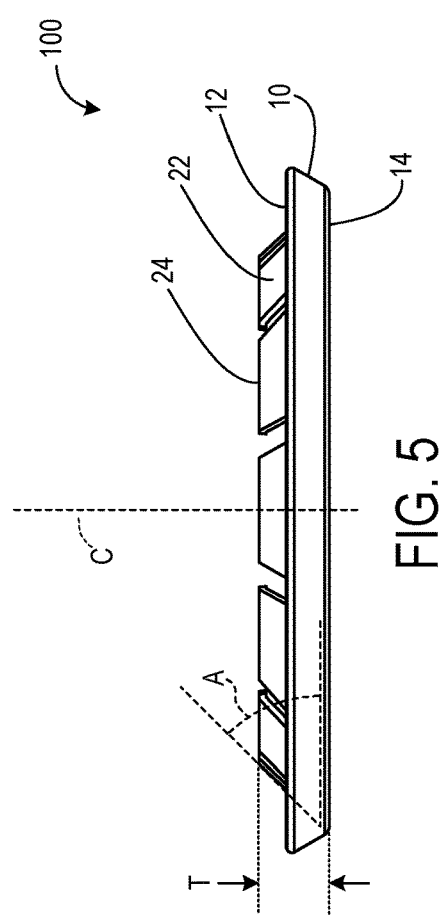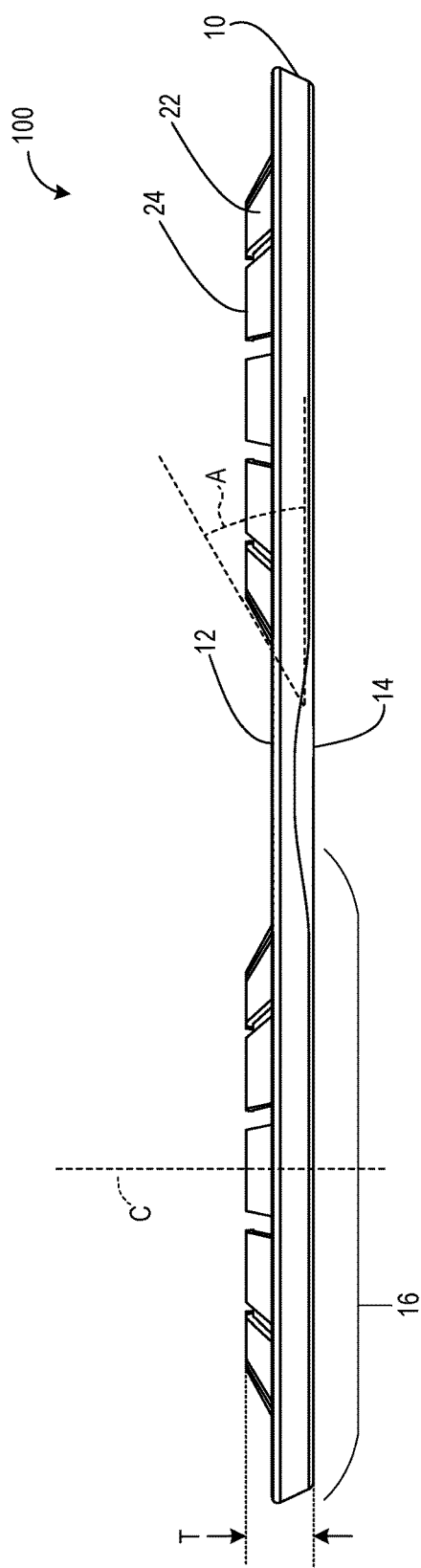

VARIABLE CONE CONTAINER CARRIER

BACKGROUND

Container carriers are used in retail environments to secure a group of containers so that they may be grasped and carried as a single unit. Manufacturers using these container carriers may desire to use a container with a cap that is shaped differently from the neck of the container. While round-necked containers with round caps may be inserted and removed from a conventional container carrier with relative ease, a container with, for example, an oblong cap is not able to be inserted or removed from a conventional container carrier.

SUMMARY

To address the above issues, a container carrier and manufacturing method for a container carrier are disclosed herein. According to a first aspect, a container carrier for securing together and carrying one or more containers comprising an integrally molded body including a top surface, a bottom surface, and one or more oval structures is provided. Each oval structure has a circumferential rib with a plurality of flanges coupled to the circumferential rib. Each flange includes an inwardly projecting portion. An inner perimeter of each flange is formed to have an arcuate shape, the inner perimeters of the flanges being collectively configured to define a void. Potential advantages of this configuration are that multiple containers may be carried together yet individually removed from the container carrier, and the container carriers are configured to accept containers with non-circular caps.

In this aspect, the arcuate inner perimeters of the flanges may collectively form a void with a circular perimeter. A potential advantage of this configuration is that containers having a round neck can be releasably secured in the container carrier.

In this aspect, the circular perimeter of the void may be centered on a vertical central axis of the oval. A potential advantage of this configuration is that the containers secured within the container carrier will be balanced, thereby avoiding a potential ergonomic burden on the user carrying the containers.

In this aspect, the flanges of each oval structure may be configured to flex independently during ingress or egress of one of the containers into or out of the corresponding void, and, in an unflexed state, the flanges may collectively conform to a curvature of a neck of one of the containers to releasably engage the container, the neck being smaller than a lip or a cap of the container. A potential advantage of this configuration is that the container carrier is configured to accommodate caps that are of different shapes or larger sizes than the necks of the corresponding containers that are to be secured therein.

In this aspect, at least two of the plurality of flanges may have different lengths. A potential advantage of this configuration is the flanges may be customized to form a configuration that best suits the shapes and sizes of the intended containers and their corresponding caps.

In this aspect, each inwardly projecting portion may extend inwardly from the circumferential rib, and all of the inwardly projecting portions may be oriented upwardly at a predetermined angle from the circumferential rib. A potential advantage of this configuration is that the inwardly projecting portions are collectively configured to releasably engage a container at its neck and distribute the weight of the container across the plurality of inwardly projecting portions.

In this aspect, the predetermined angle of the upward orientation may be in a range from 15 to 60 degrees. A potential advantage of this configuration is that the angle of the inwardly projecting and upwardly oriented portions may be customized to form a configuration that best supports the intended containers and their corresponding caps.

In this aspect, the container carrier may include a plurality of oval structures, and each oval structure may be connected to at least one other oval structure by a substantially planar bridge. Potential advantages of this configuration is that the container carrier may be customized as desired to hold different numbers of containers, and the bridge structure increases stability of the container carrier.

In this aspect, one or more of the plurality of flanges of each oval structure may be provided with a support rib, the support rib bridging the flange and the circumferential rib of the corresponding oval structure. A potential advantage of this configuration is that the support ribs provide increased strength and stability to the flanges and oval structures.

In this aspect, the integrally molded body may be formed to be substantially planar. A potential advantage of this configuration is that the height profile of the container carriers is minimized, thereby allowing for more efficient packing and shipping of the container carriers.

In this aspect, the substantially planar body may be between 5 and 25 millimeters thick in a vertical direction. A potential advantage of this configuration is that the height of the container carrier may be customized to form a configuration that best supports the intended containers and their corresponding caps.

In this aspect, the container carrier may be formed of a flexible plastic. Potential advantages of this configuration are that the container carrier is lightweight yet durable and may be recycled after use, and further the flanges of the container carrier may flexibly deform to secure and release containers therein.

In this aspect, the container carrier may further comprise an integrally formed graspable loop that is coupled at each of two ends to a substantially planar bridge. Potential advantages of this configuration are that a user may easily grasp the loop, and the integral formation of the loop provides increased strength and durability.

In another aspect, a manufacturing method for a container carrier for securing together and carrying one or more containers is provided. The method includes molding an integrally formed substantially planar body with a top surface, a bottom surface, and one or more oval structures. The manufacturing method further includes forming each oval structure to have a circumferential rib with a plurality of flanges coupled to the circumferential rib, each flange including an inwardly projecting portion. The manufacturing method further includes forming an inner perimeter of each flange to have an arcuate shape, the inner perimeters of the flanges being collectively configured to define a void. Potential advantages of this configuration are that multiple containers may be carried together yet individually removed from the container carrier, and the container carriers are configured to accept containers with non-circular caps.

In this aspect, the arcuate inner perimeters of the flanges may collectively form a void with a circular perimeter. A potential advantage of this configuration is that containers having a round neck can be releasably secured in the container carrier.

In this aspect, the flanges of each oval structure may be configured to flex independently during ingress or egress of one of the containers into or out of the corresponding void, and, in an unflexed state, the flanges may collectively conform to a curvature of a neck of one of the containers to releasably engage the container, the neck being smaller than a lip or a cap of the container. A potential advantage of this configuration is that the container carrier is configured to accommodate caps that are of different shapes or larger sizes than the necks of the corresponding containers that are to be secured therein.

In this aspect, at least two of the plurality of flanges may have different lengths. A potential advantage of this configuration is the flanges may be customized to form a configuration that best suits the shapes and sizes of the intended containers and their corresponding caps.

In this aspect, each inwardly projecting portion may extend inwardly from the circumferential rib, and all of the inwardly projection portions may be oriented upwardly at a predetermined angle from the circumferential rib. A potential advantage of this configuration is that the inwardly projecting portions are collectively configured to releasably engage a container at its neck and distribute the weight of the container across the plurality of inwardly projecting portions.

In this aspect, one or more of the plurality of flanges of each oval structure may be provided with a support rib, the support rib bridging the flange and the circumferential rib of the corresponding oval structure. A potential advantage of this configuration is that the support ribs provide increased strength and stability to the flanges and oval structures.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows a front view of the container carrier of FIG. 1, wherein the back view is an identical image thereof.

FIG. 6 shows a right view of the container carrier of FIG. 1, wherein the left view is an identical image thereof.

DETAILED DESCRIPTION

Selected embodiments of the present disclosure will now be described with reference to the accompanying drawings.

It will be apparent to those skilled in the art from this disclosure that the following descriptions of the embodiments of the disclosure are provided for illustration only and not for the purpose of limiting the disclosure as defined by the appended claims and their equivalents.

Figure 1:
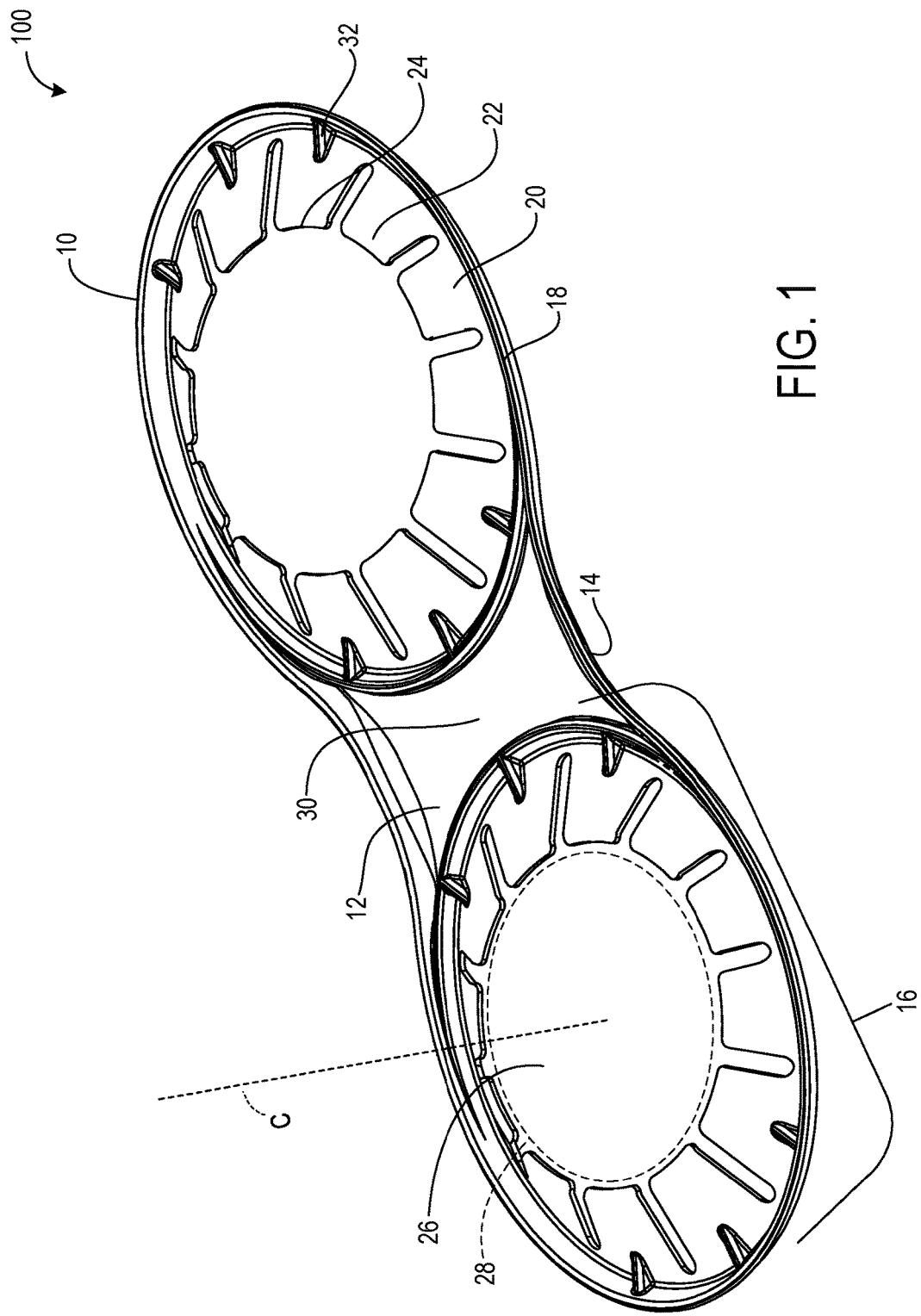
FIG. 1 shows a top perspective view of a container carrier according to one embodiment of the present description.

Turning to the figures, FIG. 1 illustrates one embodiment of a container carrier 100 configured to secure together and carry one or more containers at one time. The body 10 of the container carrier 100 may be integrally molded and may include at least a top surface 12, a bottom surface 14, and one or more oval structures 16. In the present embodiment, the body 10 of the container carrier 100 is preferentially formed by injection molding; however, it will be appreciated that another suitable molding technique may be employed to form the body 10 of the container carrier 100.

Each oval structure 16 may include a circumferential rib 18. A plurality of flanges 20 may be coupled to the circumferential rib 18. Each flange 20 may further include an inwardly projecting portion 22. In the present embodiment, twelve flanges 20 are provided in each oval structure 16, but it will be appreciated that the number of flanges 20 in the oval structures 16 may be more or less than illustrated, so long as their shape and position is sufficient to releasably secure a container. Each of the oval structures 16 may be formed to be elliptical, ovoid, or in another non-circular looped shape.

An inner perimeter 24 of each flange 20 is formed to have an arcuate shape. Collectively, the inner perimeters 24 of the flanges 20 may be configured to define a void 26. Further, the void 26 defined by the arcuate inner perimeters 24 of the flanges may be formed to have a circular perimeter 28. The circular perimeter 28 of the void 26 may be centered on a vertical central axis C of the oval structure 16.

Figure 7A:
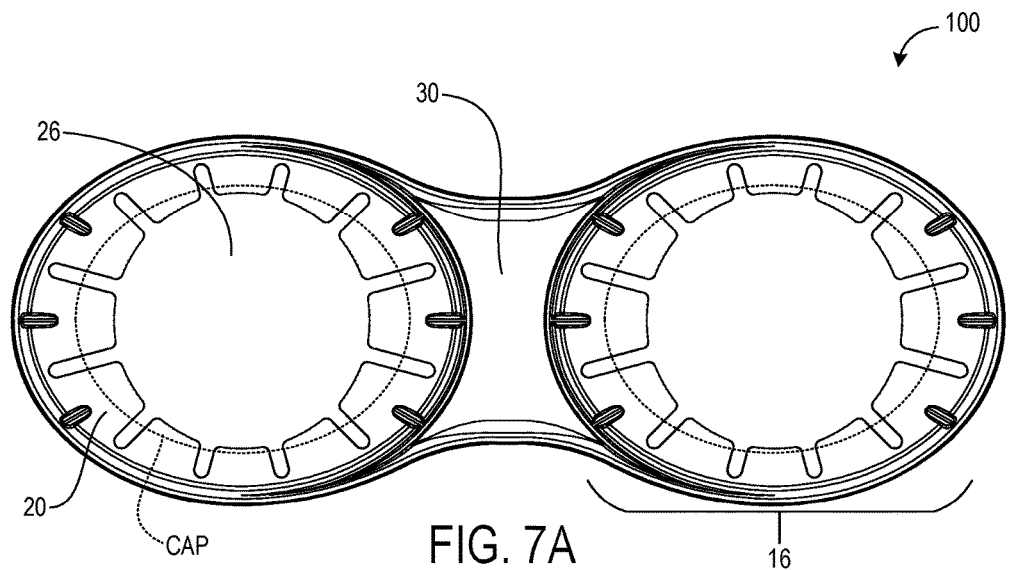
FIGS. 7A-7B show top and side views of the container carrier of FIG. 1 releasably engaging containers with oval caps.
Figure 7B:
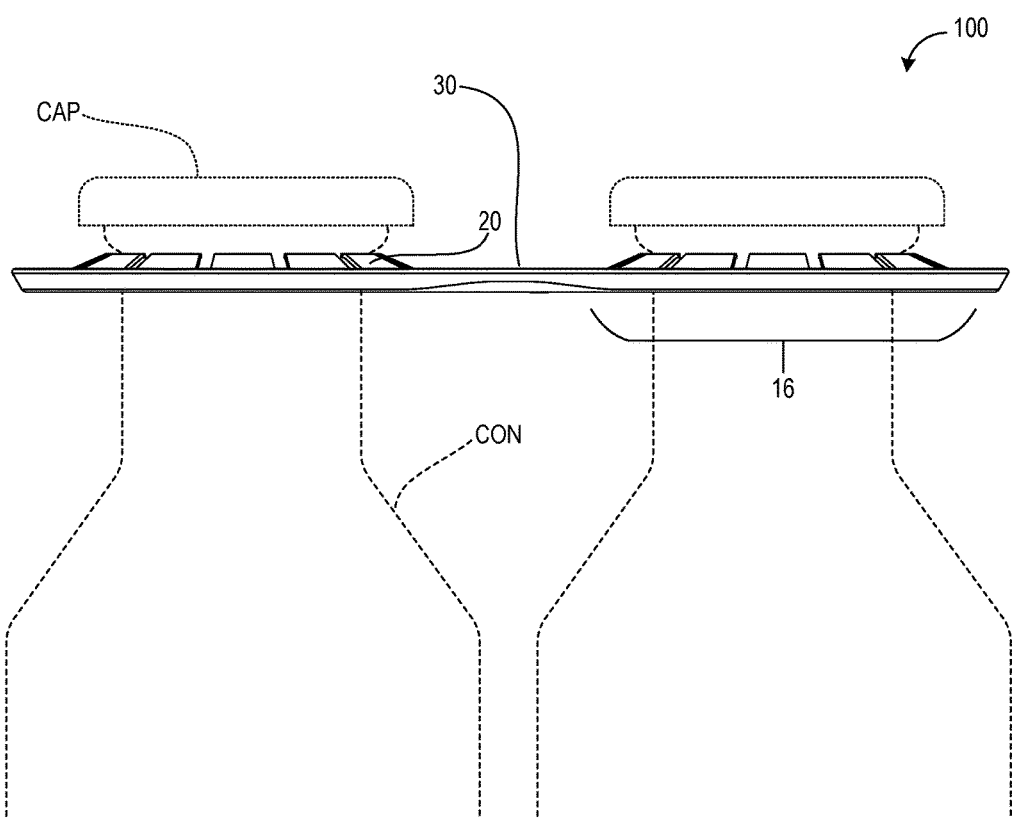

Turning briefly to FIGS. 7A and 7B, top and side views of one embodiment of the container carrier 100 releasably engaging containers CON with oval caps CAP are shown. The flanges 20 included in each oval structure 16 may be configured to flex independently during ingress or egress of one of the containers CON into or out of the corresponding void 26. In an unflexed state, the flanges 20 may be collectively configured to conform to a curvature of a neck of one of the containers CON. The flanges 20 are thus configured to releasably engage a container CON at the neck, the outer diameter of the neck being smaller than an inner diameter of a lip or a cap CAP of the container CON, as illustrated in FIGS. 7A and 7B. In the provided example embodiment, the caps CAP are shown to have an oval shape; however, it will be appreciated that the caps may possess a shape other than oval.

Turning back to FIG. 1, one or more of the plurality of flanges 20 of each oval structure 16 may be provided with a support rib 32. The support rib 32 may bridge the flange 20 and the circumferential rib 18 of the corresponding oval structure 16 to increase strength and stability of the container carrier 100. In the illustrated embodiment, flanges 20 arranged at opposite ends of the long axis of each oval structures 16 are provided with a support rib 32, which adds dimensional support to the oval structures 16 by coupling the circumferential ribs 18 and flanges 20. It will be appreciated that support ribs 32 may be included on or absent from any number of the flanges 20 and that the illustrated embodiment provides only one example of myriad possibilities in which the support ribs 32 may be arranged on the flanges 20, such as centered or offset. One or more support ribs 32 may also be arranged between flanges 20 at the point of connection to the circumferential rib 18. Additionally, the thickness and shape of the support ribs 32 may vary depending on the size, shape, and/or weight of container and/or its corresponding cap. For example, the support ribs 32 on a container carrier 100 designed to carry heavier containers may be more numerous, thicker, and/or longer than support ribs 32 on a container carrier 100 that is intended for relatively lighter containers.

Figure 2:
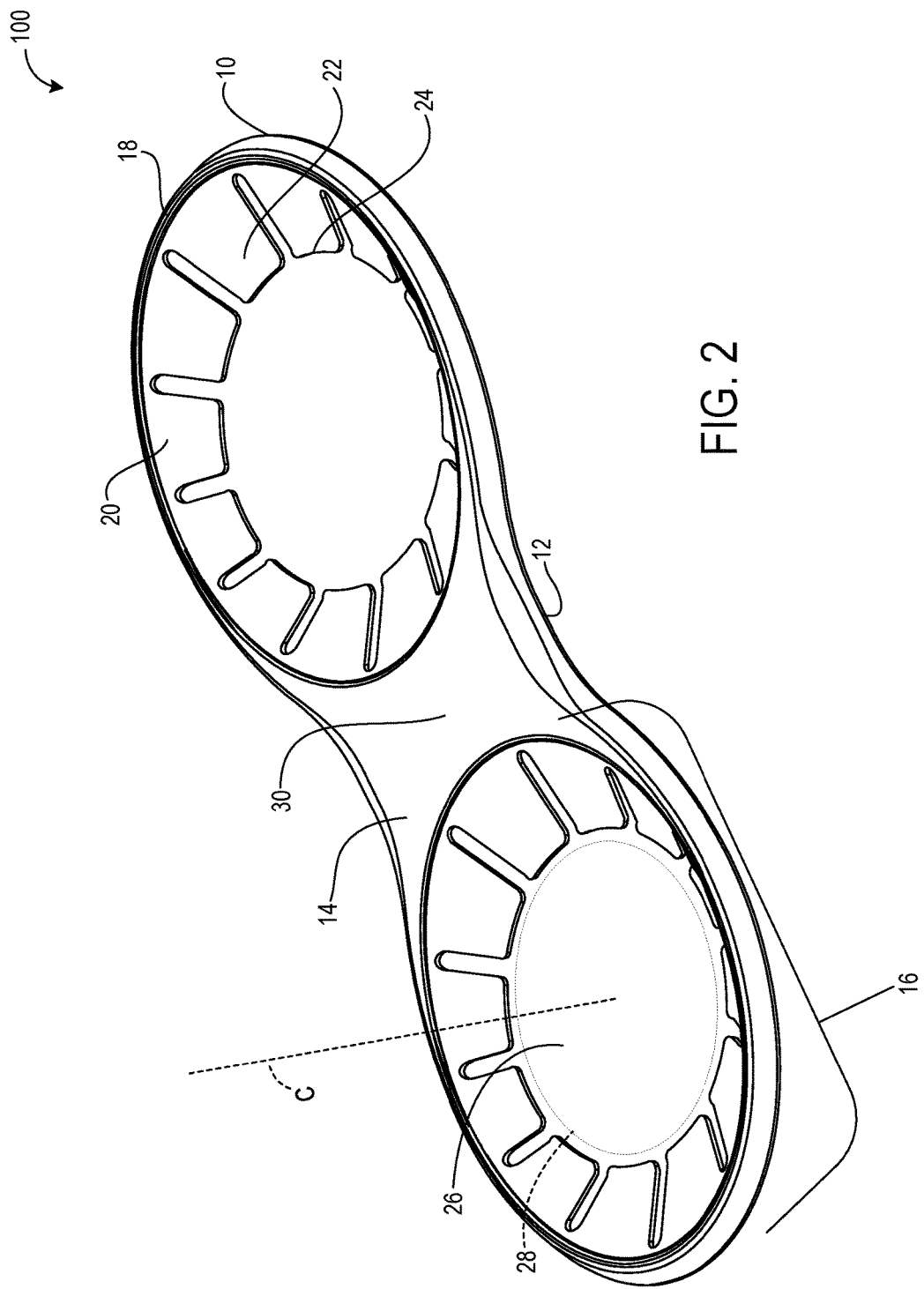
FIG. 2 shows a bottom perspective view of the container carrier of FIG. 1.

Turning to FIG. 2, a bottom perspective of the container carrier 100 is shown. In the illustrated example, the circumferential rib 18 of the container carrier 100 is present but thinner on the bottom surface 14 of the container carrier 100. It will be appreciated that, in other embodiments, the circumferential rib 18 may be thicker on the bottom surface 14 as compared to the top surface 12, or of equal thickness on both the top and bottom surfaces 12, 14 of the container carrier 100. Further, while the support ribs 32 are absent on the bottom surface 14 of the container carrier 100 in the illustrated embodiment, it will be appreciated that support ribs 32 may formed on either or both of the top and bottom surfaces 12, 14 of the container carrier 100.

Figure 3:
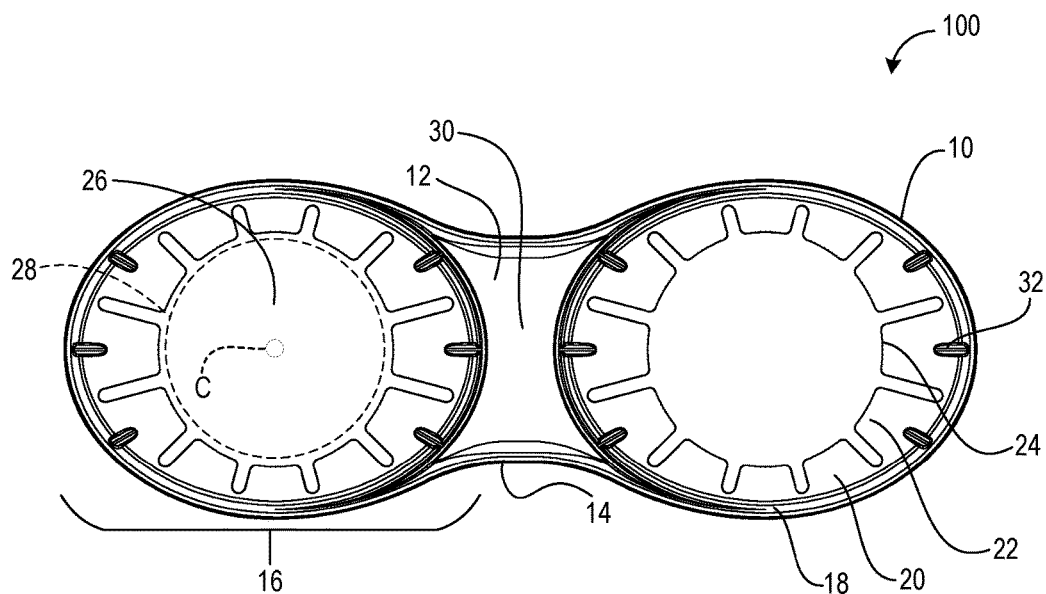
FIG. 3 shows a top view of the container carrier of FIG. 1.
Figure 4:
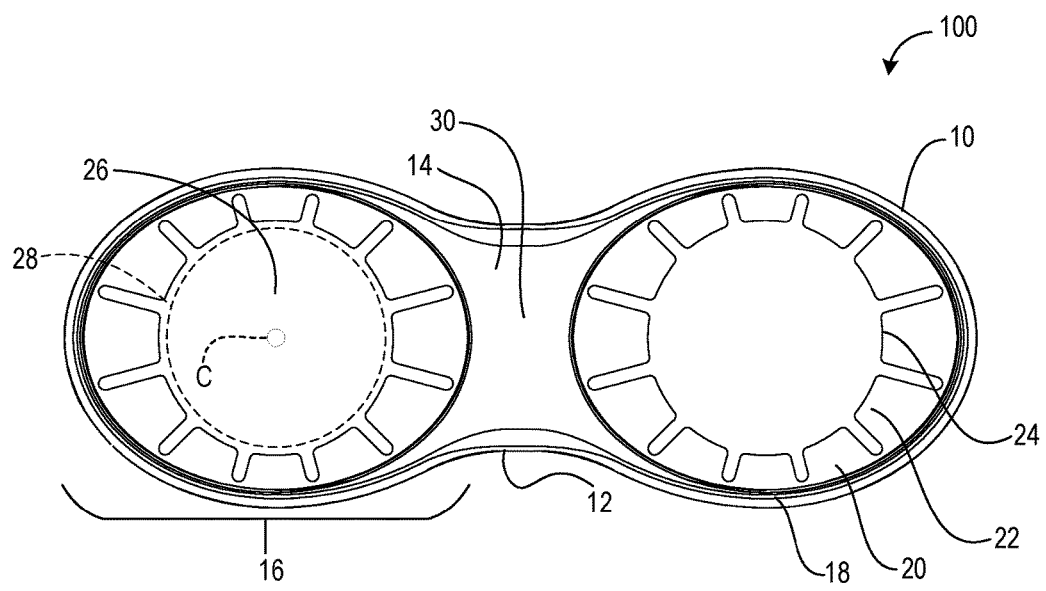
FIG. 4 shows a bottom view of the container carrier of FIG. 1.

Continuing now to FIGS. 3 and 4, top and bottom views of the container carrier 100 are provided. As discussed above, the flanges 20 may be attached to a circumferential rib 18 of an oval structure 16 while the inner perimeters 24 of the flanges 20 may collectively define a void 26 with a circular inner perimeter 28. As discussed above and illustrated in the present embodiment, the circular perimeter 28 of the void 26 may be centered on a vertical central axis C of the oval structure 16. However, it will be appreciated that the circular perimeter 28 of the void 26 may be offset with respect to the oval structure 16.

The arrangement of the flanges 20 defining a circular inner perimeter 28 within an oval structure 16 may give rise to a configuration in which at least two of the plurality of flanges 20 may have different lengths. When the oval structure 16 includes an even number of flanges 20, as shown in FIGS. 3 and 4, a pair of flanges 20 arranged opposite one another across the void 26 may be formed to be the same length. Further, each flange 20 may be formed to have a different length than an adjacent flange 20. This configuration may be observed in an embodiment of a container carrier 100 in which the oval structure 16 and the circular inner perimeter 28 of the void 26 are both centered on central vertical axis C. While the illustrated embodiment includes an even number of flanges 20, with the oval structure 16 and the circular inner perimeter 28 of the void 26 both centered on the central vertical axis C, it will be appreciated that the configuration of the container carrier 100 is not limited to illustrated embodiment. For example, the flanges 20 may occur in an even or an odd number and may be formed to be equal in length to, or longer or shorter than an adjacent flange 20 to accommodate a desired container size/weight and/or a desired cap size/shape. Further, as discussed above, the circular perimeter 28 of the void 26 may be offset with respect to the oval structure 16.

Turning now to FIGS. 5 and 6, side and end views of the container carrier 100 are illustrated. With reference to FIG. 1, each flange 20 may include an inwardly projecting portion 22. As shown in FIGS. 5 and 6, each inwardly projecting portion 22 may extend inwardly from the circumferential rib 18, and all of the inwardly projecting portions 22 may be oriented upwardly at a predetermined angle A from the circumferential rib 18. The predetermined angle A of the upward orientation may be in a range from 15 to 60 degrees, in one example. Depending on the size or shape of a container neck and cap, as well as the weight of the contents of a container, the upward orientation of the predetermined angle A may be customized to provide the necessary stiffness or flexibility to accommodate a desired container.

As shown in FIGS. 5 and 6, the integrally molded body 10 of the container carrier 100 may be formed to be substantially planar. Preferably, the substantially planar body 10 of the container carrier 100 may be between 5 and 25 millimeters thick in a vertical direction. The planar configuration of the container carrier 100 coupled with the upward orientation of the inwardly projection portions 22 allows multiple like-shaped container carriers 100 to nest inside one another when stacked. This feature increases the efficiency of packaging and shipping the container carriers 100, and also allows for multiple container carriers 100 to be loaded into a mechanical applicator for applying to containers. Further, when a container carrier 100 releasably engages containers, the product and its labels are not obscured thereby providing maximum product and label visibility. If desired, the planar body of a container carrier 100 may allow for placement of a bar code or price tag, further increasing the aesthetic value of the product contained therein.

Looking now at FIGS. 1-4, 7A, 8A, and 9A, the container carrier 100 may include a plurality of oval structures 16. In the illustrated embodiments, FIGS. 1-4 and 7A include two oval structures 16, and the container carriers 100 in FIGS. 8A and 9A include four oval structures 16. However, it will be appreciated that, in other embodiments, the number of oval structures 16 may be more or less than illustrated, so long as their number is sufficient to releasably secure the desired size and shape of the intended containers. In embodiments possessing a plurality of oval structures 16, each oval structure 16 may be connected to at least one other oval structure 16 by a substantially planar bridge 30.

Figure 8A:
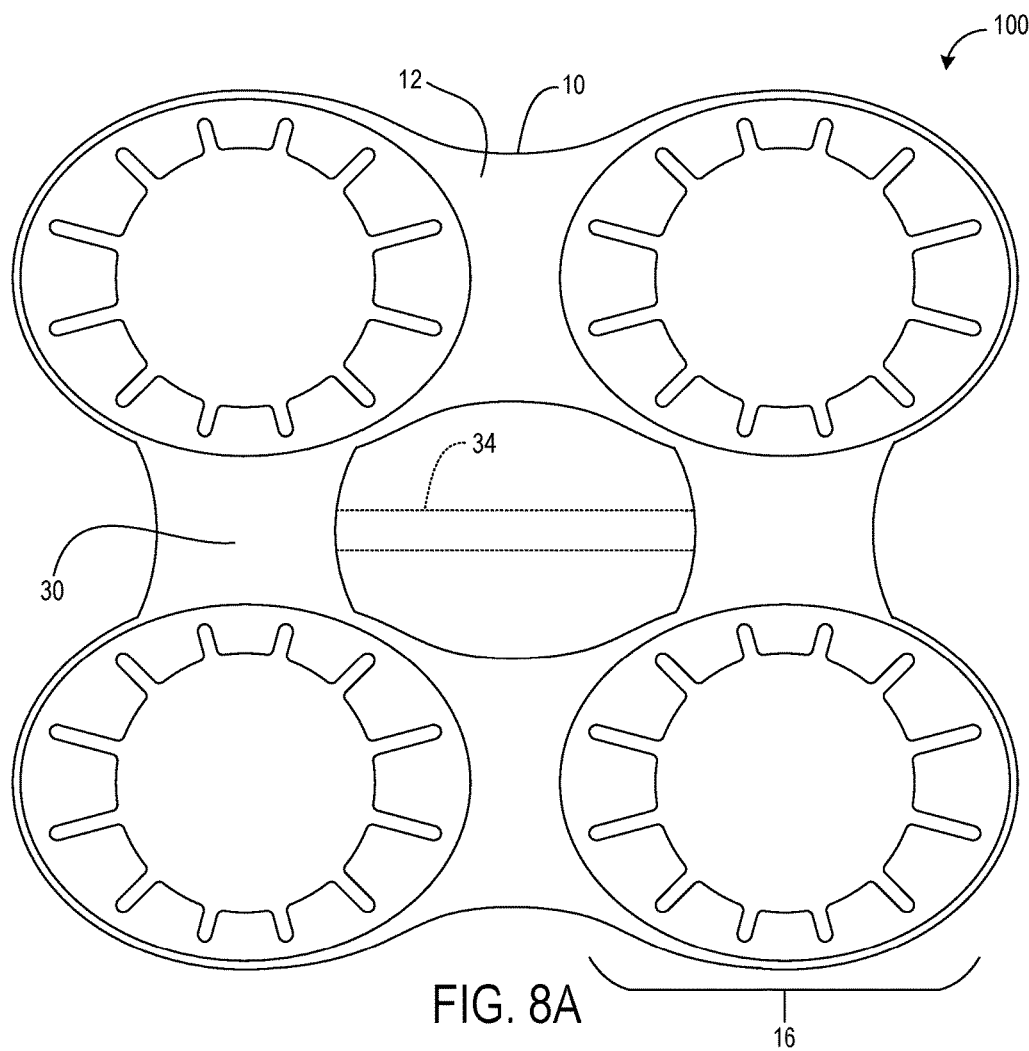
FIGS. 8A-8B show top and side views of the container carrier of FIG. 1 having a graspable loop that extends beyond the top surface of the container carrier.
Figure 8B:
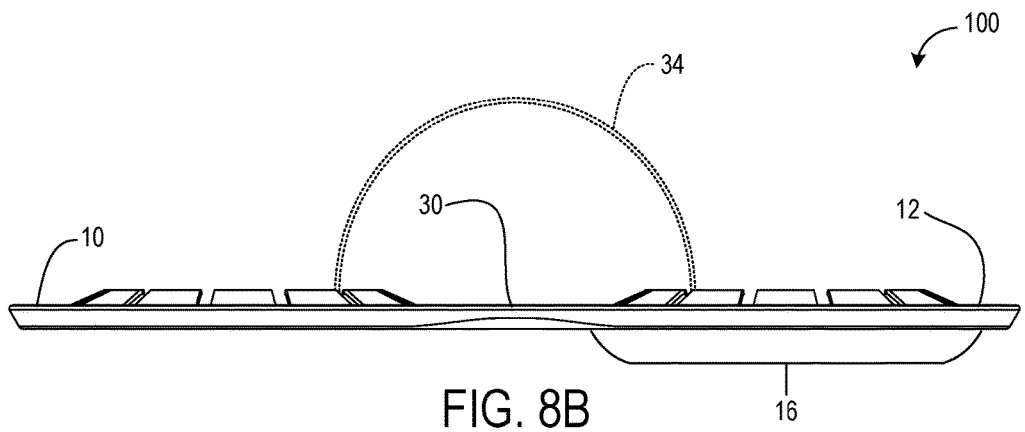
Figure 9A:
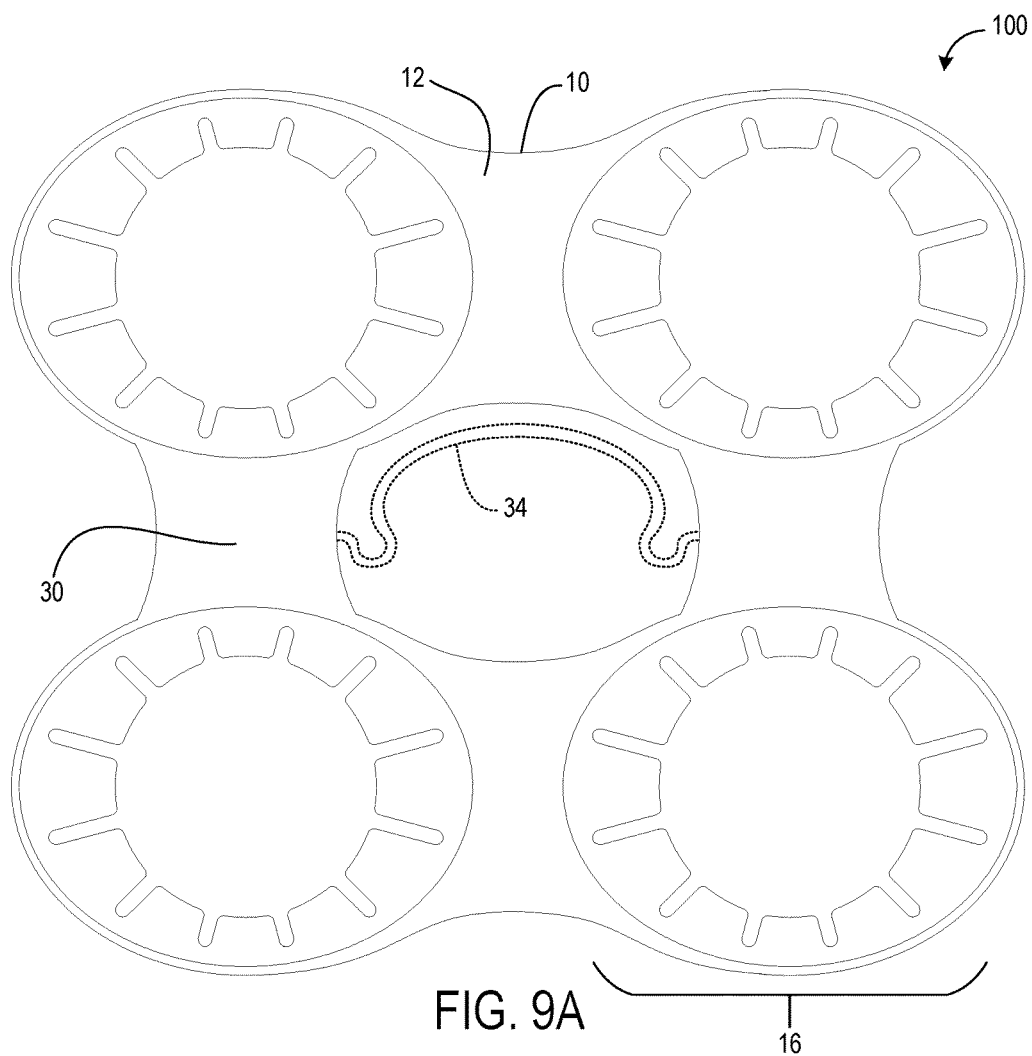
FIGS. 9A-9B show top and side views of the container carrier of FIG. 1 having a graspable loop that is in a horizontal plane with the body of the container carrier.
Figure 9B:
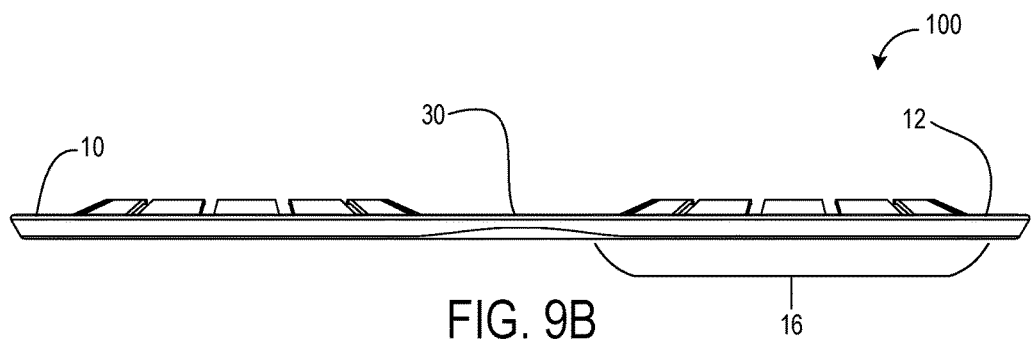

As shown in FIGS. 8A, 8B, 9A, and 9B, the container carrier 100 may further comprise an integrally formed graspable loop 34 that is coupled at each of two ends to a substantially planar bridge 30. In FIGS. 8A-8B, an example embodiment of the container carrier 100 having a graspable loop 34 that extends beyond the top surface 12 of the container carrier 100 is illustrated. An alternate embodiment in which the graspable loop 34 is in a horizontal plane with the body 10 of the container carrier 100 is shown in FIGS. 9A-9B. Of note, the graspable loop 34 is not visible in FIG. 9B, as it is in plane with the body 10 of the container carrier 100. It will be appreciated that the graspable loop 34 may occur in a configuration that is not illustrated herein. For example, the graspable loop 34 may be formed as a strap handle, a finger loop, or a bale. Furthermore, a graspable loop 34 may be integrally formed on an outside portion of an oval structure 16 or a bridge 30 to provide leverage for removing a container from the container carrier 100.

In any of the embodiments described herein, the container carrier 100 may be preferentially formed of a flexible plastic. Being both strong and lightweight, plastic is an advantageous material for use in container carriers 100. It is preferable that the plastic be flexible in nature to accommodate the releasable engagement of the containers with the flanges 20. Specifically, the plastic may be high density polyethylene (HDPE), and it may further be recycled HDPE. It will be appreciated that container carriers 100 formed of flexible plastic have the additional benefit of being recyclable.

The container carriers described above may be used to provide a convenient carrying mechanism for containers of all sorts, but are particularly advantageous due to the manner in which the flanges are configured to flex around oval shaped caps to secure containers with round necks.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A container carrier for securing together and carrying one or more containers comprising:
   an integrally molded body including a top surface, a bottom surface, and one or more oval structures;
   wherein each oval structure has a circumferential rib with a plurality of flanges coupled to the circumferential rib, each flange including an inwardly projecting portion; and
   wherein an inner perimeter of each flange is formed to have an arcuate shape, the arcuately shaped inner perimeters of the flanges being collectively configured to define a void with a circular perimeter.

2. The container carrier of claim 1, wherein the circular perimeter of the void is centered on a vertical central axis of the one or more oval structures.

3. The container carrier of claim 1,
   wherein the flanges of each oval structure are configured to flex independently during ingress or egress of one of the containers into or out of the void; and
   wherein in an unflexed state the flanges collectively conform to a curvature of a neck of one of the containers to releasably engage the container, the neck being smaller than a lip or a cap of the container.

4. The container carrier of claim 1, wherein at least two of the plurality of flanges have different lengths.

5. The container carrier of claim 1, wherein each inwardly projecting portion extends inwardly from the circumferential rib, and all of the inwardly projecting portions are oriented upwardly at a predetermined angle from the circumferential rib.

6. The container carrier of claim 5, wherein the predetermined angle of the upward orientation is in a range from 15 to 60 degrees.

7. The container carrier of claim 1, wherein the container carrier includes a plurality of oval structures, each oval structure being connected to at least one other oval structure by a substantially planar bridge.

8. The container carrier of claim 7, further comprising an integrally formed graspable loop that is coupled at each of two ends to a substantially planar bridge.

9. The container carrier of claim 1, wherein one or more of the plurality of flanges of each oval structure is provided with a support rib, the support rib bridging the one or more of the plurality of flanges and the circumferential rib of the corresponding oval structure.

10. The container carrier of claim 1, wherein the integrally molded body is formed to be substantially planar.

11. The container carrier of claim 10, wherein the substantially planar body is between 5 and 25 millimeters thick in a vertical direction.

12. The container carrier of claim 1, wherein the container carrier is formed of a flexible plastic.

13. A manufacturing method for a container carrier for securing together and carrying one or more containers, the method comprising:
   molding an integrally formed substantially planar body including a top surface, a bottom surface, and one or more oval structures;
   forming each oval structure to have a circumferential rib with a plurality of flanges coupled to the circumferential rib, each flange including an inwardly projecting portion; and
   forming an inner perimeter of each flange to have an arcuate shape, the arcuately shaped inner perimeters of the flanges being collectively configured to define a void with a circular perimeter.

14. The method of claim 13,
   wherein the flanges of each oval structure are configured to flex independently during ingress or egress of one of the containers into or out of the void; and
   wherein in an unflexed state the flanges collectively conform to a curvature of a neck of one of the containers to releasably engage the container, the neck being smaller than a lip or a cap of the container.

15. The method of claim 13, wherein at least two of the plurality of flanges have different lengths.

16. The method of claim 13, wherein each inwardly projecting portion extends inwardly from the circumferential rib, and all of the inwardly projection portions are oriented upwardly at a predetermined angle from the circumferential rib.

17. The method of claim 13, wherein one or more of the plurality of flanges of each oval structure is provided with a support rib, the support rib bridging the flange and the circumferential rib of the corresponding oval structure.

18. A container carrier for securing together and carrying one or more containers comprising:
   an integrally molded body including a top surface, a bottom surface, and one or more oval structures;
   wherein each oval structure has a circumferential rib with a plurality of flanges coupled to the circumferential rib, each flange including an inwardly projecting portion;
   wherein an inner perimeter of each flange is formed to have an arcuate shape, the arcuately shaped inner perimeters of the flanges being collectively configured to define a void with
   a circular perimeter; and
   wherein at least two of the plurality of flanges have different lengths.

* * * * *